United States Patent
Povolny et al.

(10) Patent No.: US 10,054,662 B2
(45) Date of Patent: Aug. 21, 2018

(54) ONBOARD-INSTALLATION FOR A VEHICLE

(71) Applicant: Kapsch TrafficCom AG, Vienna (AT)

(72) Inventors: Robert Povolny, Vienna (AT); Oliver Nagy, Vienna (AT)

(73) Assignee: Kapsch TrafficCom AG, Vienna (AT)

(*) Notice: Subject to any disclaimer, the term of this patent is extended or adjusted under 35 U.S.C. 154(b) by 50 days.

(21) Appl. No.: 14/253,627

(22) Filed: Apr. 15, 2014

(65) Prior Publication Data

US 2014/0316685 A1    Oct. 23, 2014

(30) Foreign Application Priority Data

Apr. 19, 2013 (EP) .................................. 13164397

(51) Int. Cl.
*G01S 5/00* (2006.01)
*G06Q 20/32* (2012.01)
(Continued)

(52) U.S. Cl.
CPC ........ *G01S 5/0027* (2013.01); *G06Q 20/3278* (2013.01); *G07B 15/063* (2013.01);
(Continued)

(58) Field of Classification Search
CPC ..... H04W 4/008; H04W 4/021; H04W 4/046; G01S 5/0027; G06Q 20/3278; G08G 1/017; G08G 1/149; G07B 15/063
See application file for complete search history.

(56) References Cited

U.S. PATENT DOCUMENTS

2004/0212517 A1* 10/2004 Inoue ........................... 340/905
2005/0285743 A1* 12/2005 Weber ........................ 340/572.1
(Continued)

FOREIGN PATENT DOCUMENTS

WO    2010/031625 A1    3/2010
WO    2011/159171 A2    12/2011

OTHER PUBLICATIONS

Extended European Search Report received for Application No. 13164397.5, dated Mar. 19, 2014, 8 pages (Official Copy Only).
(Continued)

*Primary Examiner* — Adam R Mott
(74) *Attorney, Agent, or Firm* — Fiala & Weaver P.L.L.C.

(57) ABSTRACT

The present subject matter relates to an onboard unit for a traffic telematics system, comprising: a first communication module, designed for near-range radio communication with a first external communication device, a second communication module, designed for far-range radio communication with a second external communication device, and a non-volatile memory, which can be accessed both by the first and the second communication module, wherein each communication module has a power-supplied communication mode and a powerless or power-saving rest mode, and wherein the power supply of the memory during an access thereto is effected by the accessing communication module. The present subject matter further relates to an onboard system for a vehicle comprising such an onboard unit, and to a communication device for said system.

19 Claims, 3 Drawing Sheets

(51) Int. Cl.
  *H04W 4/021* (2018.01)
  *H04W 4/04* (2009.01)
  *G08G 1/017* (2006.01)
  *G07B 15/06* (2011.01)
  *G08G 1/14* (2006.01)

(52) U.S. Cl.
  CPC ............. *G08G 1/017* (2013.01); *G08G 1/149* (2013.01); *H04W 4/021* (2013.01); *H04W 4/046* (2013.01); *Y02B 60/50* (2013.01); *Y02D 70/00* (2018.01)

(56) References Cited

U.S. PATENT DOCUMENTS

| | | |
|---|---|---|
| 2006/0155430 A1 | 7/2006 | Burgess |
| 2010/0087983 A1* | 4/2010 | Boss et al. ........................ 701/33 |
| 2010/0148947 A1 | 6/2010 | Morgan et al. |
| 2011/0125363 A1 | 5/2011 | Blumer et al. |
| 2011/0136429 A1* | 6/2011 | Ames et al. ................. 455/41.1 |
| 2013/0146669 A1* | 6/2013 | Almond ............... H04B 5/0031 235/492 |
| 2014/0181955 A1* | 6/2014 | Rosati ..................... G06F 21/44 726/18 |

OTHER PUBLICATIONS

First Examination Report received for New Zealand IP No. 621996, dated Mar. 18, 2014, 2 pages.
European Search Report received for Application No. 13164397.5, dated Nov. 18, 2013, 5 pages (Official Copy Only).
"PILZ—The Spirit of Safety: Configurable control systems PNOZmulti 2—Pilz INT," available at <https://www.pilz.com/eshop/catalog/query/(layout=7_70_14_86&uiarea=0)/.do?query=PNOZ+m+Es&searchTypeOptions=shop>, downloaded Oct. 13, 2016, 1 page.
"Hilscher—Communicadtion Module," available at <http://www.hilscher.com/products/product-groups/embedded-modules/communication-module/?>, downloaded Oct. 13, 2016, 3 pages.
"Siemens—End-to-End Transparency with RFID Systems from Siemens," available at <http://w3.siemens.com/mcms/identification-systems/en/rfid-systems/communication-modules/Pages/default.aspx>, downloaded Oct. 13, 2016, 2 pages.
Office Action received for Australian Patent Application No. 2014201166, dated Dec. 12, 2017, 4 Pages.
Office Action received for Australian Patent Application No. 2014201166, dated May 17, 2017, 4 Pages.
Office Action received for Australian Patent Application No. 2014201166, dated May 17, 2018, 8 Pages.

* cited by examiner

ONBOARD-INSTALLATION FOR A VEHICLE

CROSS-REFERENCE TO RELATED APPLICATION(S)

This application claims priority to European Patent Application No. 13 164 397.5, filed on Apr. 19, 2013, the entirety of which is incorporated by reference herein.

BACKGROUND

Technical Field

The present subject matter relates to an onboard unit for a traffic telematics system. The present subject matter further relates to an onboard system for a vehicle comprising such an onboard unit.

Background Art

Onboard units (OBUs) are used in a large number of different applications of traffic telematics systems, whether for electronic identification of a vehicle or for payment of road, access, area or city tolls, for payment of parking fees, for access control (for example barrier systems), for electronic vehicle registration (EVR), etc. For this purpose, onboard units are often equipped with a short-range communication module, for example in accordance with the DSRC (dedicated short range communication) standard, so that they can be localised to the local radio coverage range of an interrogating radio beacon. Here, the communication module is supplied with power together with the rest of the electronics of the onboard unit by a battery installed in the onboard unit.

In order to save power and to achieve a long service life of the battery, onboard units or the communication module thereof generally have a power-supplied or power-consuming working and communication mode and a power-saving rest mode. By addressing the onboard unit by means of an external communication device, for example a radio beacon of a road toll system, an access barrier, a control device or the like, the onboard unit can be awakened from its rest mode and shifted temporarily into its working or communication mode; it then lapses back into the rest mode until the next communication. Commercially obtainable onboard units can currently achieve a battery service life of up to seven years in this way.

BRIEF SUMMARY

An object of the disclosed subject matter is to equip onboard units of the aforementioned type with further functionalities, in particular without impairing the battery service life of the onboard unit.

This object is achieved in a first aspect with an onboard unit for a traffic telematics system comprising:
a first communication module, designed for near-range radio communication with a first external communication device,
a second communication module, designed for far-range radio communication with a second external communication device, and
a non-volatile memory, which can be accessed both by the first and the second communication module,
wherein each communication module has a power-supplied communication mode and a powerless or power-saving rest mode, and
wherein the power supply of the memory during an access thereto is effected by the accessing communication module.

In accordance with an embodiment the onboard unit, in addition to the short-range communication module mentioned in the Background Art section, is also equipped with a further communication module which is designed for an even shorter radio range, referred to here as "near-range radio communication". In the present description, near-range radio communication is understood to mean communication over a radio range of at most a few centimeters or a few tens of centimeters, as is implemented in particular by the NFC (near field communication) standard. For distinction, the conventional short-range communication module of the onboard unit will be referred to hereinafter as a "far-range communication module". In the present description, such a far-range radio communication will be understood to mean communication over a far range of at most a few meters, a few tens of meters, or a few hundred meters, as is implemented for example by the DSRC (dedicated short range communication), CEN-DSRC, UNI-DSRC, IEEE 802.11p or WAVE (wireless access for vehicular environments) or ITS-G5 standards, including WLAN and Wifi®, Bluetooth® or also active and passive RFID (radio frequency identification) technologies.

In accordance with an embodiment the near-range communication module and the far-range communication module access a common non-volatile memory, for example a flash memory, wherein the near-range communication module, during use thereof, effects the power supply of the memory, such that there is no need to start up the power-intensive far-range communication module. Additional near-range functionalities can thus be created without increasing the power demand of the onboard unit, that is to say without significantly impairing the battery service life of the onboard unit. For example, configuration data for the onboard unit can thus be input via the near-range radio interface, or arbitrary data can be read out from the onboard unit, for example logfiles for inspection by the user or authorities, without "waking up" the main- or far-range communication components of the onboard unit and thus loading the battery.

Here, the power supply to the memory during the memory access can be effected in two ways. On the one hand the power can be supplied directly by the communication module accessing the memory if the communication module for example has its own power supply (battery) or can be supplied with power directly via radio ("passive transponder"), such as a passive NFC or RFID tag. It is particularly favourable if the near-range communication module is a passive NFC tag, that is to say functions in accordance with the NFC standard and can be supplied with power via radio. NFC requires a close proximity of the external communication device to the onboard unit in order to establish communication, which gives the user assurance of addressing precisely this onboard unit. Due to the radio power supply of the NFC tag, it is ensured that the battery of the onboard unit is in no way used during this process.

The second communication module may optionally be a passive RFID tag, which can be supplied with power via radio in order to save battery power.

On the other hand, the power supply to the memory during access to the memory can be effected by an activation or switching-on of a separate power supply, for example a battery, to the memory. For example, the onboard unit has its own or an external battery for power supply, and the respective communication module accessing the memory, said communication module being fed by this battery in the communication mode, actuates a switch during the memory access, said switch switching on the power supply to the memory at least only for the duration of the memory access.

This also includes the case that the switch detects ("feels") the memory access, for example over the memory access bus of the communication module, in order to then apply the power supply to the memory in a timely manner. These embodiments are favourable for those types of communication modules and memories in which a power supply via radio would not be sufficient to supply sufficient power to the communication module and/or the memory during the memory access.

The far-range communication module could in principle be of any type known in the art for onboard units, for example a mobile radio module for a cellular mobile network (public land mobile network, PLMN). The far-range communication module may, for example, be a DSRC or WAVE module or an active RFID tag, which is supplied with power by the battery of the onboard unit. Alternatively, the second communication module could also be supplied exclusively via radio power, for example in the form of a passive RFID tag.

The onboard unit or the memory may, for example, be designed to prioritise a memory access of the far-range communication module over a memory access of the near-range communication module. Alternatively the far-range communication module, if in the communication mode, can deactivate the first communication module. Collisions in the event of memory access can be prevented by these measures: The far-range radio communication thus always enjoys higher priority than the near-range radio communication, which prevents faults in the traffic telematics system.

As already mentioned briefly, the memory may, for example, contain configuration data for the traffic telematics system which can be written into the memory via the near-range communication module and can be read out from the memory via the far-range communication module. Here, the configuration data may be in particular one or more of the following elements: user identification, vehicle identification, tolling account identification, axle number, tolling parameters, load designation, account credit or account balance of an electronic purse of the onboard unit, cryptographic keys, or timestamps, in particular concerning vehicle use. If the external near-range communication device for example is a mobile telephone, smartphone or the like, which is equipped with an NFC transceiver and corresponding application software, the account balance of the electronic purse of the onboard unit can be charged in this way or the onboard unit can thus be configured in general for operation, for example.

Alternatively or additionally, the memory may contain transaction data of the traffic telematics system which can be written into the memory via the far-range communication module and can be read out from the memory via the first communication module. Here, the transaction data may be one or more of the following elements: location data, beacon identifications, load designation, tolling transactions, parking fee transactions, account balance of an electronic purse of the onboard unit, cryptographic keys, or timestamps, in particular concerning vehicle use. For example, logfiles, protocols, etc. can thus be read out via the near-range radio interface, for example into an NFC-enabled mobile telephone or smartphone belonging to the user or a controller.

In a further aspect an embodiment creates an onboard system for a vehicle which on the one hand comprises an onboard unit of the type presented here, of which the memory contains an identification of the onboard unit which can be read out via the first communication module, and on the other hand a further NFC tag, separate from the onboard unit, which contains an identification of the separate further NFC tag which can be read out via radio.

The onboard system enables the control of the vehicle linking of an onboard unit to a vehicle. Onboard units of the type mentioned here are generally attached releasably to the vehicle due to their autonomous power supply and therefore the need for an occasional battery exchange, which in itself runs the risk of manipulations if a clear association between the onboard unit on the one hand and vehicle on the other hand is required, for example for vehicle registration or charging purposes. Due to the use of a separate further NFC tag, which can be read out together with the near-range communication module of the onboard unit by the external communication device, the identification of the onboard unit on the one hand read out in such a way and the characterisation of the separate tag on the other hand can be checked for correct association.

It is particularly favourable if the further NFC tag is formed as an adhesive label, which, once adhered, can no longer be detached without being destroyed. The separate NFC tag thus produces a permanent vehicle linking between the tag identification and vehicle, whereas the associated identification of the onboard unit can be used for the corresponding purposes in the traffic telematics system, for example for toll or parking fee purposes, EVR purposes, access purposes, etc.

In accordance with an example variant the memory of the onboard unit may also contain the identification of the separate further NFC tag, which facilitates the checking of the NFC tag identification.

In yet a further aspect an embodiment creates an external near-range communication device for an onboard system of the type presented here, which is characterised in that it is formed as an NFC reader and is designed to read out the identification of the onboard unit from the onboard unit and to read out the identification of the separate further NFC tag from the separate further NFC tag and to check against a database of onboard unit identifications and NFC tag identifications associated with one another, or in that it is formed as an NFC reader and is designed to read out the identification of the separate further NFC tag from the memory of the onboard unit on the one hand and from the separate further NFC tag on the other hand and to check these against one another. The vehicle linking of an onboard unit attached (in fact releasably) in the vehicle can thus be checked using a single device, more specifically by jointly reading out the identification of the permanently attached NFC tag.

In yet a further aspect an embodiment lastly creates an onboard unit of the type presented here, which is characterised by a third communication module which is formed as an NFC reader and is designed to read out the identification of a further NFC tag, separate from the onboard unit, and to write this identification into the memory, wherein the far-range communication module of the onboard unit is formed as a DSRC, ITS-G5 or WAVE module and is designed to transmit the NFC tag identification read out in such a way to a second external communication device. The vehicle linking of the onboard unit can also be verified with these embodiments. The separate NFC tag may, for example, be again formed for this purpose as an adhesive label, which, once adhered, can no longer be detached without being destroyed.

The first communication module and the third communication module may, for example, be formed by a common NFC module which can be switched over between an operating mode as first communication module and an operating mode as third communication module.

Further features and advantages, as well as the structure and operation of various embodiments, are described in detail below with reference to the accompanying drawings.

BRIEF DESCRIPTION OF THE DRAWINGS/FIGURES

The present subject matter will be explained in greater detail hereinafter with reference to exemplary embodiments illustrated in the accompanying drawings, in which.

Embodiments will now be described with reference to the accompanying drawings.

DETAILED DESCRIPTION

Figure 1:
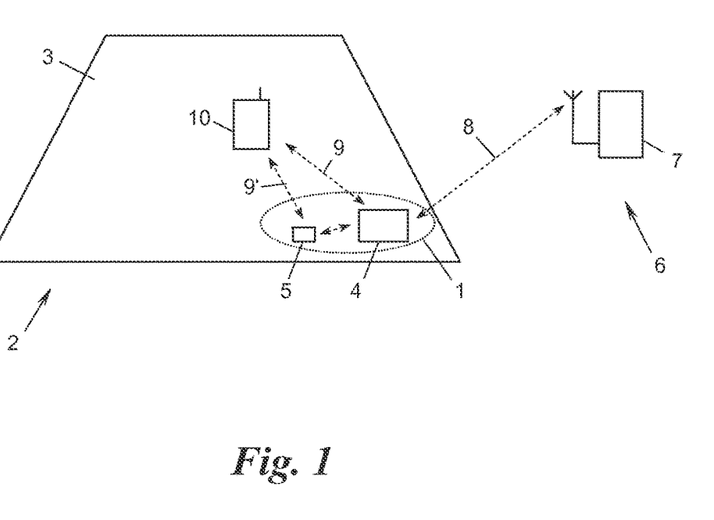
FIG. 1 shows a schematic overview of an onboard system according to an embodiment for a vehicle, said onboard system being connected to external first and second communication devices.

FIG. 1 shows an onboard system 1 for a vehicle 2, of which the only detail that is shown is the windscreen 3. The onboard system 1 can be fitted in or on the vehicle 2, for example adhered to the inner face of the windscreen 3. The onboard system 1 comprises an onboard unit 4 and an NFC tag (near field communication tag) 5 separate therefrom, of which the function will be explained below in greater detail.

The onboard unit 4 serves for radio communication with a traffic telematics system 6, of which only a communication device in the form of a roadside radio beacon 7 (roadside entity, RSE) is shown representatively and by way of example. The radio beacon 7 may be both stationary and mobile, for example arranged on a control vehicle or formed as a hand-held device for a controller, and handles radio communications 8 with the onboard unit 4 via a transceiver 7', for example if the vehicle 2 passes the radio beacon 7 or vice versa.

If the radio coverage range of its radio communications 8 is limited to a local area, the radio beacon 7 can locate the onboard unit 4 in this area, for example in order to bill a location usage of the vehicle 2 in the form of road, access, area or city tolls, in order to collect a parking fee, in order to release an access barrier, or in order to record an identification of the vehicle 2, its user, etc. read out from the onboard unit 4 etc., etc.

The onboard unit 4 of the onboard system 1 is also capable of handling radio communications with a further external communication device 10 of the user via a further radio interface 9. For example, the communication device 10 may be a mobile telephone, smartphone, notebook PC or tablet PC, personal digital assistant (PDA), etc. belonging to the user of the vehicle or to a controller. The communication device 10 may also handle further radio communications 9' with the separate NFC tag 5.

The radio communications 9, 9' between the ("first") external communication device 10 and the onboard system 1, that is to say the onboard unit 4 and the NFC tag 5, are designed exclusively for the near range, that is to say their radio range is limited to a few centimeters or a few tens of centimeters, such that the communication device 10 has to be brought into the immediate vicinity of the onboard unit 4 and of the NFC tag 5 in order to be able to carry out the radio communications 9, 9'. By contrast, the radio communications 8 between the onboard unit 4 and the ("second") external communication device 7 have a much larger range by comparison, for example a few meters, a few tens of meters, or a few hundred meters, such that they are also referred to here as "far-range" radio communications 8, although this is also short-range radio here, for example in accordance with short-range radio standards such as DSRC (dedicated short range communication), CEN-DSRC, UNI-DSRC, WAVE (wireless access for vehicular environments) and IEEE 802.11p, ITS-G5, WLAN (wireless local area network), Wifi®, Bluetooth®, RFID (radio frequency identification) or the like.

Figure 2:
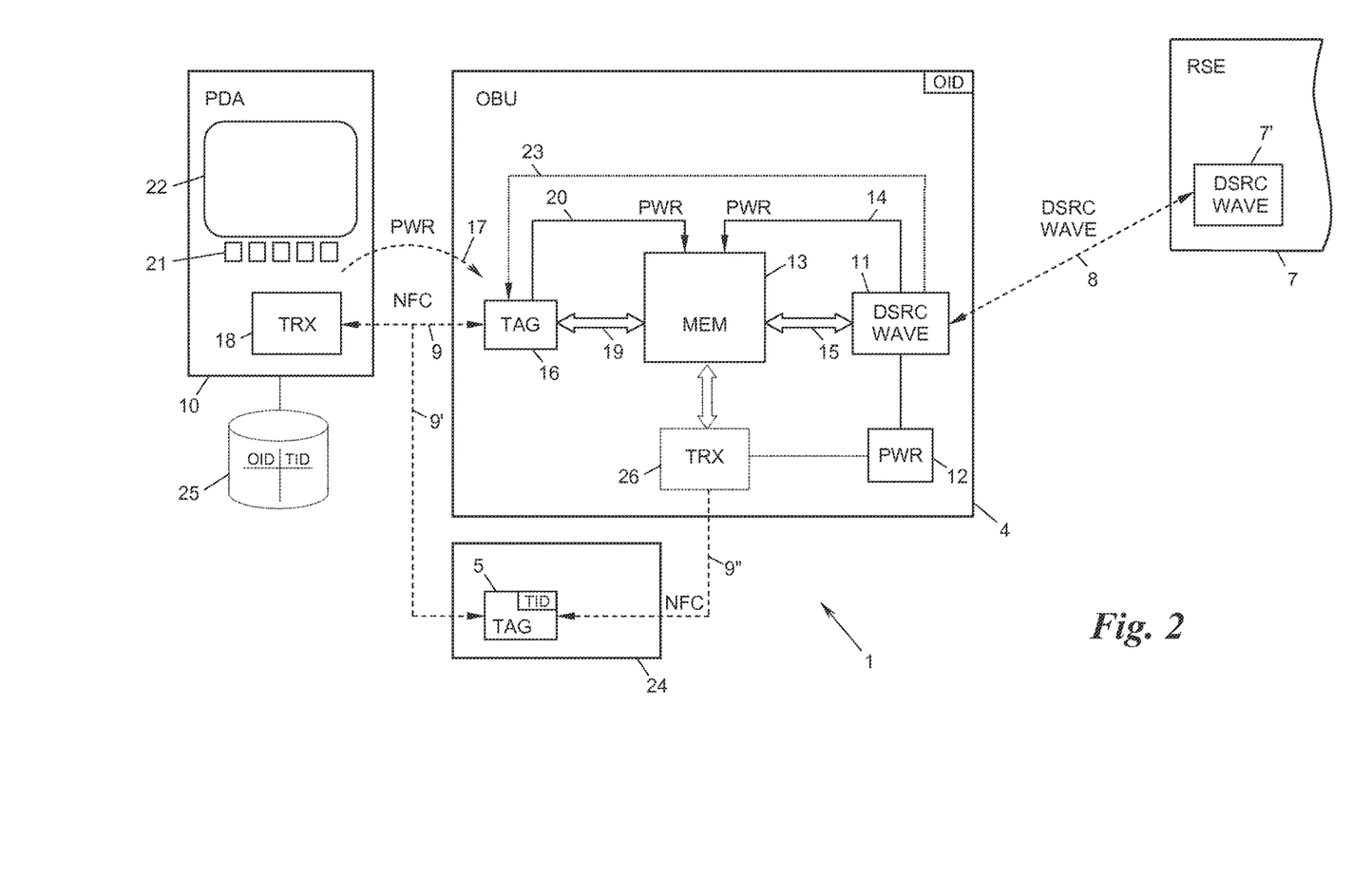
FIG. 2 shows, in the form of a block diagram, a first embodiment of the onboard system from FIG. 1 connected to first and second external communication devices.

FIG. 2 shows the structure of the onboard system 1, of the first communication device 10 and of the second communication device 7 for handling the radio communications 9, 9' and 8 in detail. For the far-range radio communications 8 with the second communication devices 7, for example radio beacons, the onboard unit 4 contains a corresponding far-range communication module 11 in accordance with the respective short-range radio standard DSRC, CEN-DSRC, UNI-DSRC, WAVE, IEEE 802.11p, ITS-® WLAN, Wifi®, Bluetooth® or RFID, which is supplied with power by a battery 12 of the onboard unit 4 (a communication module 11 according to the RFID standard which requires such a power supply 12 will also be referred to here as an "active" RFID tag). The battery 12 may also be part of an arrangement connected via a cable to the onboard unit 4.

The far-range communication module 11 of the onboard unit 4 can access a memory 13 of the onboard unit 4 in order to prepare, generate or process the radio communications 8, more specifically the data packets transmitted and/or received therein, said memory containing configuration and/or transaction data for this purpose. For example, the memory 13 contains configuration data for the correct functioning of the onboard unit 4 in the traffic telematics system 6, or credits for the specified accounts, such as one or more of the following elements: a unique identification of the onboard unit 4 (OBU identification), a user identification of the driver of the vehicle 2, a vehicle identification of the vehicle 2, an identification of a toll or fee account of the user or of the vehicle, vehicle parameters such as axle number, weight, size, purpose etc. of the vehicle 2, toll- or parking-fee-specific parameters such as fee class, passenger number or the specified vehicle parameters, etc., etc. The configuration data may also contain data, in particular the account balance, of an "electronic purse" in the onboard unit 4 or of a credit or debit account in the traffic telematics system 6, or credits for the specified accounts. The configuration data may further also be load designations, with the result that the content of the memory 13 forms a load protocol; cryptographic keys for encrypted communications via the communication modules, and/or timestamps, in particular by the vehicle driver for temporal control of the vehicle use, with the result that the onboard unit forms an "electronic tachograph". For such a timestamp recording, an OBU-internal clock is advantageous which can possibly be synchronised by the near-range and/or far-range radio communications 9, 8 from the communications devices 10, 7, for example when passing radio beacons.

Additionally or alternatively, the memory 13 can contain transaction data, which it receives or collects during the operation of the onboard unit 4 in the traffic telematics system 6, for example said data being constituted by one or more of the following elements: location data, which the onboard unit 4 records itself or receives from radio beacons 7, beacon identifications of radio beacons 7 passed by the onboard unit, identifications of communication devices 7 encountered by the onboard unit, toll or parking fee transactions generated over the course of far-range radio communications 8, for example when passing a roadside radio beacon 7, transactions which influence or reproduce the account balance of an electronic purse of the onboard unit 4 or of a credit or debit account in the traffic telematics system 6, for example debit transactions, or load designations, dangerous goods declarations, or the like. The transaction data may also be provided with corresponding timestamps, as explained previously for the configuration data.

A far-range radio communication 8 may cause a direct activation of the far-range communication module 11 and trigger there a processing procedure, for example a signing of data in the secure environment of the onboard unit 4. This processed data may then be read out, for example immediately via a near-range radio communication 9.

Of course, the onboard unit 4 is only illustrated in a highly simplified manner for this purpose; further components such as processors, hardware or software modules, etc., which are necessary for the cooperation described here between the communication module 11 and the memory 13 and for the handling of the radio communications 8, 9 mentioned here, are not illustrated for reasons of clarity.

As illustrated symbolically by the arrow 14, power can be supplied to the memory 13 during the write and/or read access (15) of the communication module 11 to the memory 13 by the communication module 11 (and therefore by the battery 12 in the embodiment shown in FIG. 2). Of course, the arrow 14 is only symbolic here; for example, power can be supplied to the memory 13 directly by the battery 12, and the memory 13 can be supplied with power in a controlled manner correspondingly by the communication module 11 during the memory access 15.

In order to save power and to maximise the service life of the battery 12, the onboard unit 4, in particular the far-range communication module 11 thereof, can be switched over between a power-saving or powerless rest mode and a power-supplied or power-draining communication mode. In other words, the onboard unit 4 or at least the far-range communication module 11 thereof lapses, in the breaks between chronologically interspaced far-range radio communications 8, into a powerless or power-saving sleep or rest mode, from which it is woken up again for example by a new radio communication 8, which starts from the second communication device 7.

So as not to impair this energy-saving function and so as not to reduce the service life of the battery 12, the onboard unit 4, for near-range radio communications 9, comprises a separate near-range communication module 16, which, via the radio communications 9, can be supplied with power by the first external communication device 10, for example a mobile telephone belonging to the user (arrow 17). For this purpose, the communication device 10 has a reader/writer (transceiver) 18, for example an NFC reader and/or writer, designed for near-range radio communications 9. The near-range communication module 16 therefore in turn has a "powerless" rest mode when not addressed by the communication device 10 and is supplied from there with power, and a power-supplied communication mode, in which it is addressed by means of a near-range radio communication 9 and is simultaneously supplied with power from the transceiver 18 (arrow 17).

A near-range communication module 16 of this type can be produced for example as a passive NFC tag, wherein "passive" means that it is supplied with power via a radio communication 9. Passive NFC tags can also be considered as passive RFID transponders for extremely short radio ranges from a few centimeters to a few tens of centimeters.

As soon as the near-range communication module 16 is in the radio power-supplied communication mode, it can access the memory 13 (arrow 19) and in so doing can supply power to the memory 13 (arrow 20). This is independent of whether or not the far-range communication module 11 is in the communication or rest mode and in turn supplies power (14) to the memory 13, or whether or not the entire rest of the onboard unit 4 is in the rest or operating mode. The content of the memory 13 can thus be read and/or written via the near-range radio communication 9 and the passive communication module 16, irrespective of whether the onboard unit 4 and/or the far-range communication module 11 thereof is working or sleeping.

For example, configuration data of the onboard unit 4 contained in the memory 13 can thus be input from the communication device 10 or changed, for example a user identification can be input, an axle number of the vehicle can be set, etc. The near-range communication device 10 serves here as an "input arrangement" so to speak for the onboard unit 4. To this end, it needs merely to be held in the immediate vicinity of the onboard unit 4 in order to input data into the memory 13 via near-range radio communications 9, even if the onboard unit 4 or the communication module 11 thereof is in the powerless or power-saving rest mode. The communication device 10 may have a physical keypad 21 or virtual keys on a touchscreen 22 for this purpose.

Similarly, transaction data can also be read out from the memory 13 into the communication device 10 via near-range radio communications 9, for example logfiles concerning past location uses, toll and parking fee transactions, debit transactions, account balances, etc. In this sense, the communication device 10 can be used as an "output arrangement" so to speak for the onboard unit 4 and can display data thereof, for example on the display 22, without the need for the onboard unit 4 to have its own display for this purpose. The aforementioned transaction data (logfiles, protocols) may also describe, for example, loads carried by lorries, that is to say any loaded freight is declared in the onboard unit 4 and, where necessary, is also signed electronically by the onboard unit 4 if this constitutes a trustworthy environment by means of physical and electronic access control. A signing by the onboard unit 4 can be implemented for example by means of a special write command from the near-range communication module 16 or by addressing a special memory region of the memory 13, which initiates subsequent processing by the far-range communication module 11. The processing by the far-range communication module 11 can be considered for example to be particularly trustworthy if increased mechanisms are implemented in the physical and electronic access control.

In a further embodiment only a part of the entire memory 13 is available to the near-range communication module 16 for reading and writing, other memory regions being additionally protected by physical or cryptographic access mechanisms where appropriate. The memory 13 may thus also be composed of a number of physically or logically separate memory modules.

In order to ensure that the far-range communications 8, which the onboard unit 4 handles with the communication devices 7, for example radio beacons, within the scope of the traffic telematics system 6, are not impaired by the aforementioned near-range communication functionality, the memory access 15 of the far-range communication module 11 may optionally be prioritised over the memory access 19 of the near-range communication module 16, for example by appropriate design of the memory 13 or programming of the processor (not illustrated) of the onboard unit 4. Alternatively, the far-range communication module 11, if in the communication mode, could directly deactivate the near-range communication module 16 (see arrow 23) in order to ensure its priority.

The near-range communication capability of the communication device 10 and of the onboard unit 4 can be utilised subsequently to secure the vehicle linking of an onboard unit 4 (which is usually fitted releasably in the vehicle 2, not least due to the need to have to replace the battery 12 occasionally) with respect to the vehicle 2. The separate NFC tag 5, which together with the onboard unit 4 forms the aforementioned onboard system 1, is used for this purpose.

The separate NFC tag 5 is formed for example as an adhesive label 24, which, once adhered to the windscreen 3, can no longer be detached therefrom without being destroyed and thus has a permanent vehicle linking.

The separate NFC tag 5 is equipped with a radio-readable unique identification TID, which can be read out by the near-range communication device 10 over the course of a further near-range radio communication 9'. If the adhesive label 24 and the onboard unit 4 are brought into close proximity on the vehicle 2, near-range radio communications 9, 9' both with the NFC tag 16 of the onboard unit and with the separate NFC tag 5 of the adhesive label 24 can be established merely by holding out the communication device 10, and the identification OID of the onboard unit 4 and the identification TID of the further NFC tag 5 can be read out and displayed on the display 22, either simultaneously or in direct succession.

The user of the near-range communication device 10, for example a controller, can thus check whether the identifications TID and OID in the traffic telematics system 6 have been recorded as being associated with one another, for example by checking a list. This may, for example, occur automatically since the communication device 10 has access to a device-internal or external database 25, for example provided in a headquarters of the traffic telematics system 6, of onboard unit identifications OID and associated NFC tag identifications, on the basis of which the vehicle linking to the onboard unit 4, that is to say its use in the correct vehicle 2 equipped with the corresponding NFC tag 5, can be checked.

The NFC tag identification TID of the separate NFC tag 5 may optionally also be stored in the onboard unit 4, for example in the memory 13 on the occasion of the output or personalisation of the onboard unit 4 with simultaneous output of the respective NFC tag 5, such that, via the near-range radio communication 9, not only the onboard unit identification OID, but also the NFC tag identification TID stored for this purpose, can be read out and compared with the NFC tag identification TID interrogated from the adhesive label 24 via the near-range radio communication 9'. For example, the correct use of the onboard unit 4 can be checked, even without access to the database 25.

A further possibility lies in equipping the onboard unit 4 with its own NFC reader and/or writer (transceiver) 26. The transceiver 26 can, for its part, interrogate the further NFC tag 5 fitted in the vicinity via a further near-range radio communication 9" and can read out the NFC tag identification TID thereof in the memory 13. The read-out NFC tag identification TID can then be notified, for example together with the onboard unit identification OID, via a far-range radio communication 8 to the communication device 7, for example a radio beacon. For example, the correct vehicle linking of the onboard unit 4, that is to say its correct use in the correct vehicle 2, can thus also be checked each time a radio beacon 7 of the vehicle telematics system 6 is passed.

The NFC transceiver 26 can also be provided jointly with the NFC tag 16 by the same physical device, for example an NFC module, which can be selectively switched over into an NFC tag operating mode for emulating the NFC tag 16 and an NFC transceiver operating mode for emulating the NFC reader and/or writer or NFC transceiver 26. The switchover can be implemented for example upon request by one of the communication devices 7, 10.

Figure 3:
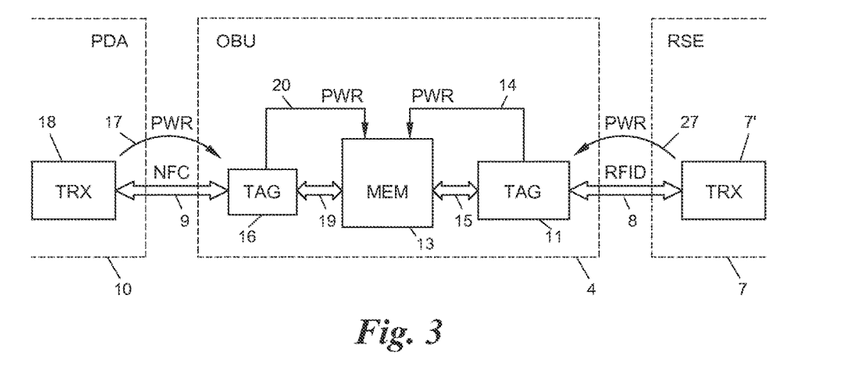
FIG. 3 shows, in the form of a block diagram, a second embodiment of the onboard unit connected to external first and second communication devices.

FIG. 3 shows a variant of the embodiment of FIG. 2, in which the far-range communication module 11 can also be supplied with power via radio, more specifically via the far-range radio communication 8 (arrow 27). The far-range radio communication 8 can be implemented here for example in accordance with the RFID standard, and the far-range communication module 11 is then a passive transponder, for example a passive RFID tag. This, if in the power-supplied communication mode, can also supply power via the (symbolic) path 14 to the memory 13 during memory access 15.

The other components illustrated in FIG. 3 correspond to the structure of FIG. 2. As can be seen, the separate NFC tag 5 or the adhesive label 24 can also be omitted, as can the battery 12 for the far-range communication module 11; further components (not illustrated) of the onboard unit 4 may also use a battery 12, where appropriate.

Figure 4:
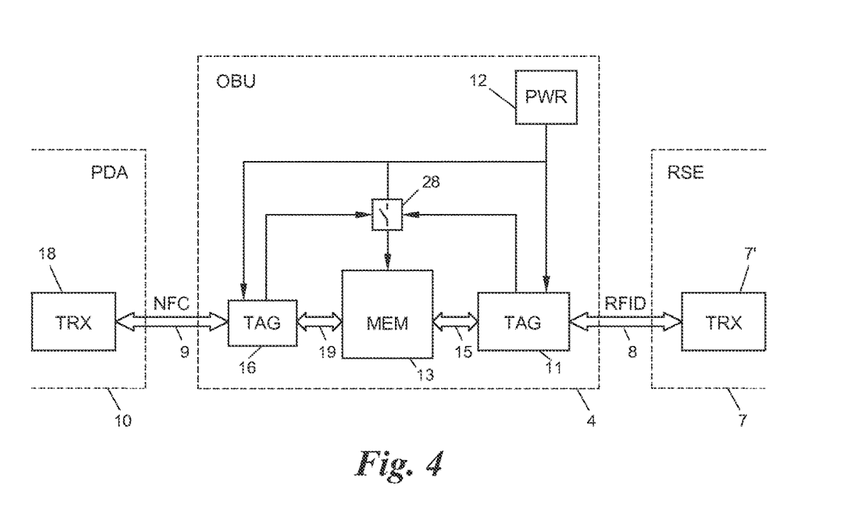
FIG. 4 shows, in the form of a block diagram, a third embodiment of the onboard unit connected to external first and second communication devices.

FIG. 4 shows a variant of the embodiments of FIGS. 2 and 3, in which the near-range and/or the far-range communication module 16, 11 do not supply power directly (for example via their own radio power supply) to the memory 13, but merely effect the switching-on of the power supply or battery 12 to the memory 13 (or the part of the memory 13 used for this purpose) during the memory access 19, 15. For this purpose, a switch is shown at 28 which is controlled by the communication module 16 and/or by the communication module 11 and effects the switching-on of the battery 12 to the memory 13 at least (and, for example, also only) for the duration of a memory access 19 or 15.

Of course, the switch 28 is only symbolic; for example, the corresponding power supply of the memory 13 during the memory access 19 or 15 can be provided directly from the respective communication module 16, 11, which is in turn powered in the communication mode by the battery 12. It is also possible for the switch 28 to detect itself the memory access 19 or 15 of a communication module 16 or 11, for example over the memory access interface of the respective communication module 16, 11, in order to then switch on the battery 12 to the memory 13 in good time for the memory access 19 or 15. All of these variants of the power supply of the memory 13 during the memory access of the respective communication module 16, 11 are included here by the expression "effecting the power supply" of the memory 13 during the access 19, 15 by the respective communication module 16, 11.

CONCLUSION

The invention is not limited to the presented embodiments, but includes all variants, modifications and combinations that fall within the scope of the accompanying claims.

What is claimed is:

1. An onboard unit for a traffic telematics system, comprising:
   a first communication module in the onboard unit, configured to generate or process near-range radio communications with a first external communication device, the first communication module comprising first processing circuitry;
   a second communication module in the onboard unit that is separate from the first communication module, configured to generate or process far-range radio communications with a second external communication device, the second communication module comprising second processing circuitry that is separate from the first processing circuitry; and
   a non-volatile memory in the onboard unit for storing data related to traffic telematics, the non-volatile memory configured to be accessed both by the first and second communication modules for the data related to traffic telematics;
   wherein each communication module has a power-supplied communication mode and a powerless or power-saving rest mode;
   wherein whether the first communication module is in its power-supplied communication mode or its powerless or power-saving rest mode is independent of whether the second communication module is in its power-supplied communication mode or its powerless or power-saving rest mode; and
   wherein power to the memory is only supplied when the first or the second communication module accesses the memory for the data related to traffic telematics.

2. The onboard unit according to claim 1, wherein the power supply of the memory during the access of the respective accessing communication module is supplied by said accessing communication module.

3. The onboard unit according to claim 1, wherein the first communication module is a passive near field communication (NFC) tag that is configured to receive power via radio.

4. The onboard unit according to claim 1, wherein the second communication module is a passive radio frequency identification (RFID) tag that is configured to receive power via radio.

5. The onboard unit according to claim 1, wherein power is supplied to the memory during an access of at least one communication module by a battery configured to be switched on via a switch controlled by the at least one communication module for the duration of the access to the memory.

6. The onboard unit according to claim 1, wherein the second communication module is a DSRC (dedicated short range communication), ITS-G5 or WAVE (wireless access for vehicular environments) module, or an active RFID tag to which power is supplied by a battery of the onboard unit.

7. The onboard unit according to claim 1, wherein the onboard unit or the memory is configured to prioritise the memory access of the second communication module over the memory access of the first communication module.

8. The onboard unit according to claim 1, wherein the second communication module, if in the power-supplied communication mode, deactivates the first communication module.

9. The onboard unit according to claim 1, wherein the memory contains configuration data for the traffic telematics system, the configuration data written into the memory via the first communication module and read out from the memory via the second communication module.

10. The onboard unit according to claim 9, wherein the configuration data contains one or more of the following elements: user identification, vehicle identification, tolling account identification, axle number, tolling parameters, load designation, account credit or account balance of an electronic purse of the onboard unit, cryptographic keys or timestamps.

11. The onboard unit according to claim 1, wherein the memory contains transaction data of the traffic telematics system, the transaction data written into the memory via the second communication module and read out from the memory via the first communication module.

12. The onboard unit according to claim 11, wherein the transaction data contains one or more of the following elements: location data, beacon identifications, load designation, tolling transactions, parking fee transactions, account balance of an electronic purse of the onboard unit, cryptographic keys or timestamps.

13. The onboard unit according to claim 1, further comprising a third communication module, which is formed as an NFC reader and is configured to read out an identification of a further NFC tag separate from the onboard unit and to write this identification into the memory, wherein the second communication module is formed as a DSRC (dedicated short range communication), ITS-G5 or WAVE (wireless access for vehicular environments) module and is configured to transmit the aforementioned identification to the second external communication device.

14. The onboard unit according to claim 13, wherein the separate NFC tag is formed as an adhesive label that is configured to produce a permanent vehicle linking between the separate NFC tag and a vehicle.

15. The onboard unit according to claim 13, wherein the first communication module and the third communication module are formed by a common NFC module configured to be switched over between an operating mode as the first communication module and an operating mode as the third communication module.

16. An onboard system for a vehicle, comprising:
   an onboard unit that includes:
      a first communication module in the onboard unit, configured to generate or process near-range radio communications with a first external communication device, the first communication module comprising first processing circuitry,
      a second communication module in the onboard unit that is separate from the first communication module, configured to generate or process far-range radio communications with a second external communication device, the second communication module comprising second processing circuitry that is separate from the first processing circuitry, and
      a non-volatile memory in the onboard unit for storing data related to traffic telematics, the non-volatile memory configured to be accessed both by the first and second communication modules for the data related to traffic telematics,
      wherein each communication module has a power-supplied communication mode and a powerless or power-saving rest mode;
      wherein whether the first communication module is in its power-supplied communication mode or its powerless or power-saving rest mode is independent of whether the second communication module is in its power-supplied communication mode or its powerless or power-saving rest mode; and wherein power to the memory is only supplied when the first or the second communication module accesses the memory for the data related to traffic telematics, the first communication module being a passive near field communication (NFC) tag configured to receive power via radio, and the memory of the onboard unit containing an identification of the onboard unit configured to be read out via the first communication module; and a further NFC tag, separate from the onboard unit, which contains a radio-readable identification of the separate further NFC tag.

17. The onboard system according to claim 16, wherein the separate further NFC tag is formed as an adhesive label configured to produce a permanent vehicle linking between the separate NFC tag and the vehicle once adhered.

18. The onboard system according to claim 16, wherein the memory of the onboard unit also contains the identification of the separate further NFC tag.

19. An onboard unit for a traffic telematics system, comprising:

a first communication module in the onboard unit, configured to generate or process near-range radio communications with a first external communication device, the first communication module comprising first processing circuitry;

a second communication module in the onboard unit that is separate from the first communication module, configured to generate or process far-range radio communications with a second external communication device, the second communication module comprising second processing circuitry that is separate from the first processing circuitry; and a non-volatile memory in the onboard unit for storing data related to traffic telematics, the non-volatile memory configured to be accessed both by the first and second communication modules for the data related to traffic telematics;

wherein each communication module has a power-supplied communication mode and a powerless or power-saving rest mode;

wherein whether the first communication module is in its power-supplied communication mode or its powerless or power-saving rest mode is independent of whether the second communication module is in its power-supplied communication mode or its powerless or power-saving rest mode; and wherein a power supply is connected to the memory via a switch, and wherein power is only supplied to the memory when the first or the second communication module controls the switch to supply the power via the power supply and accesses the memory for the data related to traffic telematics.

* * * * *